United States Patent
Zhang et al.

(10) Patent No.: US 12,170,706 B2
(45) Date of Patent: Dec. 17, 2024

(54) SERVICE REQUEST PROCESSING METHOD, RELATED APPARATUS, AND STORAGE MEDIUM

(71) Applicant: TravelSky Technology Limited, Beijing (CN)

(72) Inventors: Li Zhang, Beijing (CN); Jia Yu, Beijing (CN)

(73) Assignee: TravelSky Technology Limited, Beijing (CN)

( * ) Notice: Subject to any disclaimer, the term of this patent is extended or adjusted under 35 U.S.C. 154(b) by 0 days.

(21) Appl. No.: 18/561,706

(22) PCT Filed: Apr. 20, 2022

(86) PCT No.: PCT/CN2022/087823
§ 371 (c)(1),
(2) Date: Nov. 16, 2023

(87) PCT Pub. No.: WO2022/252852
PCT Pub. Date: Dec. 8, 2022

(65) Prior Publication Data
US 2024/0223647 A1    Jul. 4, 2024

(30) Foreign Application Priority Data
May 31, 2021  (CN) .......................... 202110604812.7

(51) Int. Cl.
*H04L 67/1008*    (2022.01)
(52) U.S. Cl.
CPC ................................ *H04L 67/1008* (2013.01)
(58) Field of Classification Search
CPC . H04L 67/1008; G06F 11/079; G06F 11/0793
(Continued)

(56) References Cited

U.S. PATENT DOCUMENTS 11,388,244 B1 * 7/2022 Ni .......................... H04L 67/01
2013/0185592 A1   7/2013 Fleming et al.
(Continued)

FOREIGN PATENT DOCUMENTS

CN    108768752 A    11/2018
CN    109298928 A    2/2019
(Continued)

OTHER PUBLICATIONS

First Office Action for Chinese Application No. 202110604812.7, dated Dec. 7, 2023.
(Continued)

*Primary Examiner* — Karen C Tang
(74) *Attorney, Agent, or Firm* — Wolf, Greenfield & Sacks, P.C.

(57) ABSTRACT

A method and an apparatus for processing a service request, and a storage medium are provided. The method includes: determining a target time period based on a time instant when a first server is switched to a second server; acquiring log data in the target time period; acquiring a first service request and a second service request; determining whether the first service request is associated with the second service request; determining, in a case that the first service request is associated with the second service request, whether an operation object of the first service request is same as an operation object of the second service request; and determining, in a case that the operation object of the first service request is different from the operation object of the second service request, that the operation object of the second service request is incorrect.

8 Claims, 2 Drawing Sheets

(58) Field of Classification Search
USPC .......................................................... 709/224
See application file for complete search history.

(56) References Cited

U.S. PATENT DOCUMENTS

2022/0044244 A1\* 2/2022 Chen .................... G06Q 20/405
2023/0040365 A1\* 2/2023 Raleigh ............. H04W 28/0257

FOREIGN PATENT DOCUMENTS

| CN | 109710439 A | 5/2019 |
| --- | --- | --- |
| CN | 110351334 A | 10/2019 |
| CN | 110677280 A | 1/2020 |
| CN | 110708196 A | 1/2020 |
| CN | 113296996 A | 8/2021 |
| JP | 2013-190955 A | 9/2013 |

OTHER PUBLICATIONS

International Search Report and Written Opinion for International Application No. PCT/CN2022/087823, mailed Jun. 28, 2022.

\* cited by examiner

//  SERVICE REQUEST PROCESSING METHOD, RELATED APPARATUS, AND STORAGE MEDIUM

This application is a national stage filing under 35 U.S.C. § 371 of International Patent Application Serial No. PCT/CN2022/087823, filed Apr. 20, 2022, which claims priority to Chinese Patent Application No. 202110604812.7, titled "SERVICE REQUEST PROCESSING METHOD, RELATED APPARATUS, AND STORAGE MEDIUM", filed on May 31, 2021 with the China National Intellectual Property Administration. The contents of these applications are incorporated herein by reference in their entireties.

FIELD

The present disclosure relates to technical field of computers, and in particular to a method and an apparatus for processing a service request, and a storage medium.

BACKGROUND

According to the civil aviation passenger transportation technology, an electronic ticket management system adopts an architecture including a primary server and a backup server to ensure the high availability of the system. When the primary server fails, the primary server may be rapidly switched to the backup server, and once the primary server restores, the backup server may be instantly switched to the primary server, thereby ensuring service continuity.

Generally, a same request may only exist in one server at a time instant. However, in processing a service request, a user often initiates multiple contextual service requests. For example, in a case that a request A is associated with a request B and the request B is associated with a request C, the primary server is switched to the backup server after the request A is processed by the primary server. When the backup server receives the request B associated with the request A, the backup server cannot process the request B due to that the request A does not exist in the backup server. After the backup server is switched to the primary server, when the primary server receives the request C associated with the request B, the primary server may mistakenly associate the request C with other requests and then process the request C due to that the request B does not exist in the primary server and many other requests exist in the primary server, resulting in errors and reducing the accuracy of the servers in processing service requests.

SUMMARY

In view of this, a method for processing a service request is provided according to the embodiments of the present disclosure to troubleshoot errors in the server processing service requests.

In a first aspect, a method for processing a service request is provided according to an embodiment of the present disclosure. The method includes: determining a target time period based on a time instant when a first server is switched to a second server; acquiring log data of the first server and log data of the second server in the target time period; acquiring a first service request and a second service request based on the log data of the first server and the log data of the second server, where the first service request and the second service request are initiated by a same user, the first service request is processed by the first server, and the second service request is processed by the second server; determining whether the first service request is associated with the second service request based on an operation instruction of the first service request and an operation instruction of the second service request; determining, in a case that the first service request is associated with the second service request, whether an operation object of the first service request is same as an operation object of the second service request; and determining, in a case that the operation object of the first service request is different from the operation object of the second service request, that the operation object of the second service request is incorrect.

In a second aspect, an apparatus for processing a service request is provided according to an embodiment of the present disclosure. The apparatus includes: a determining unit, an acquiring unit, and a judging unit. The determining unit is configured to determine a target time period based on a time instant when a first server is switched to a second server. The acquiring unit is configured to: acquire log data of the first server and log data of the second server in the target time period, and acquire a first service request and a second service request based on the log data of the first server and the log data of the second server, where the first service request and the second service request are initiated by a same user, the first service request is processed by the first server, and the second service request is processed by the second server. The judging unit is configured to: determine whether the first service request is associated with the second service request based on an operation instruction of the first service request and an operation instruction of the second service request, and determine whether an operation object of the first service request is same as an operation object of the second service request in a case that the first service request is associated with the second service request. The determining unit is further configured to, in a case that the operation object of the first service request is different from the operation object of the second service request, determine that the operation object of the second service request is incorrect.

In another aspect, a computer device is provided according to the present disclosure. The computer device includes: a memory, a processor and a bus system. The memory stores program codes. The processor is configured to, when executing instructions in the program codes, perform the method for processing a service request in the first aspect.

In another aspect, a computer-readable storage medium is provided according to the present disclosure. The computer-readable storage medium stores instructions. The instructions, when executed on a computer, cause the computer to perform the method for processing a service request in the first aspect.

In another aspect, a computer program product or a computer program is provided according to the present disclosure. The computer program product or the computer program includes computer instructions. The computer instructions are stored in a computer-readable storage medium. A processor of a computer device reads the computer instructions from the computer-readable storage medium, and the processor executes the computer instructions to cause the computer device to perform the method for processing a service request in the first aspect.

It can be seen from the above technical solutions that, the embodiments of the present disclosure have the following advantages. When the server for processing a service request is switched from the first server to the second server, the target time period is determined based on a switching time instant, and log data during the target time period is acquired. The first service request and the second service request corresponding to the user are acquired based on the log data, where the second service request is initiated by the user after the first service request. It is determined whether the first service request is associated with the second service request based on the operation instruction of the first service request and the operation instruction of the second service request. In a case that the first service request is associated with the second service request, it indicates that the second service request is initiated based on the first service request. It is determined whether the operation object of the first service request is same as the operation object of the second service request. In a case that the operation object of the first service request is different from the operation object of the second service request, it is determined that the operation object of the second service request is incorrect. With the solutions according to the present disclosure, after the first server is switched to the second server, it is determined whether the associated requests are correctly processed based on the log data of the first server and the log data of the second server, thereby troubleshooting errors in the server processing service requests.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

Figure 1:
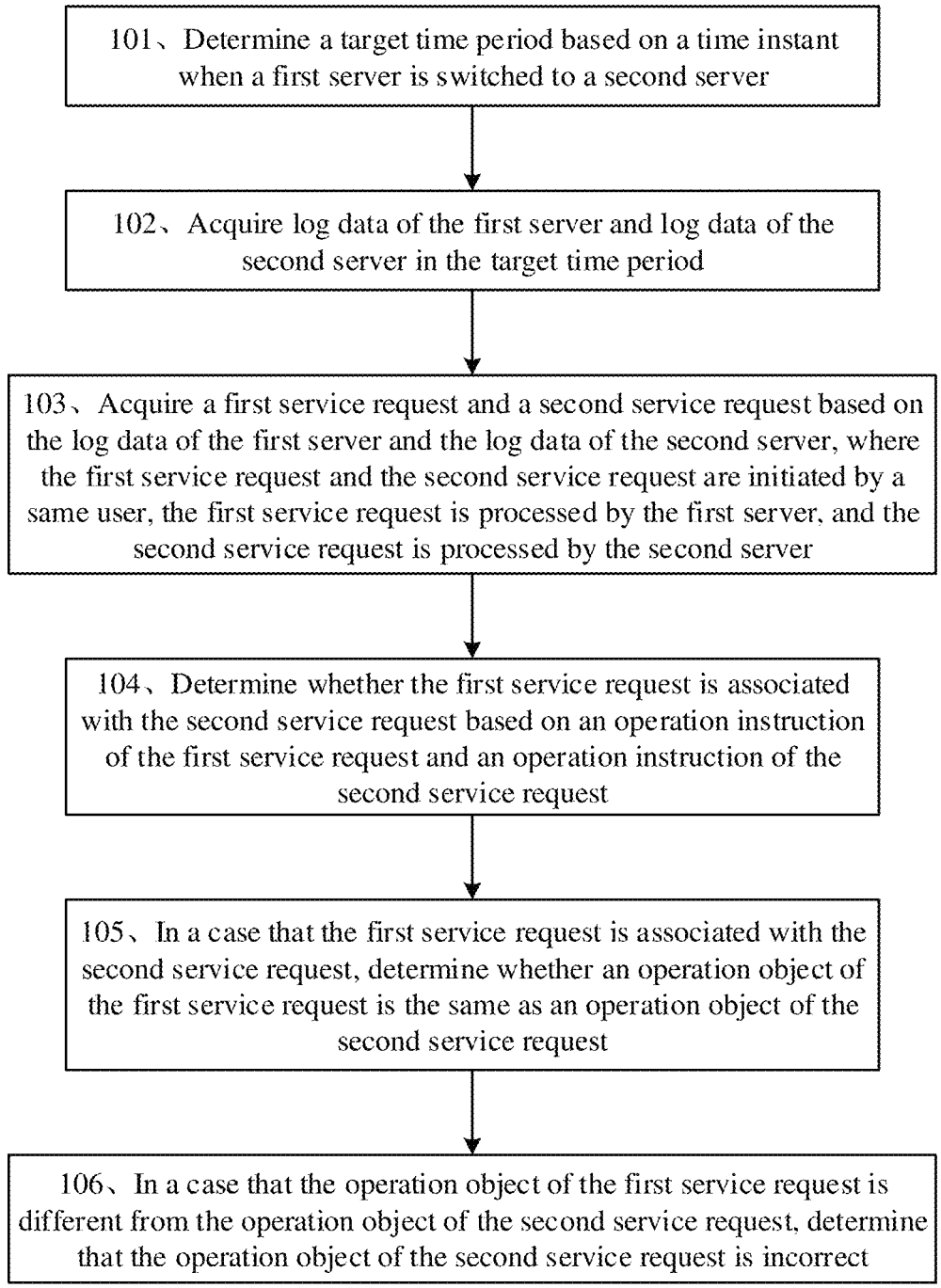
FIG. 1 is a schematic diagram of a method for processing a service request according to an embodiment of the present disclosure.

A method for processing a service request is provided according to an embodiment of the present disclosure to troubleshoot errors in the server processing service requests.

Hereinafter, the embodiments of the present disclosure are described in detail with reference to the drawings. Although some embodiments of the present disclosure are shown in the drawings, it should be understood that the present disclosure may be implemented in various forms and should not be limited to the embodiments described herein. The embodiments are provided for thoroughly and completely understanding the present disclosure. It should be understood that the drawings and the embodiments in the present disclosure are only schematic, and are not intended to limit the protection scope of the present disclosure.

Terms such as "first", "second", "third", "fourth" and the like (if exists) in the specification, the claims and the drawings of the present disclosure are used to distinguish similar objects, rather than describe a particular order or a sequential order. It should be understood that data used in this way may be interchangeable under an appropriate condition, so that the embodiments of the present disclosure described herein can be implemented in an order other than those illustrated or described herein. In addition, the terms "include", "corresponding to" and any other variants are intended to cover the non-exclusive inclusion. For example, a process, a method, a system, a product, or a device that includes a series of steps or units is not necessarily limited to steps or units expressly listed, but may include other steps or units that are not expressly listed or inherent to the process, the method, the product, or the device.

Reference is made to FIG. 1, which is a schematic diagram of a method for processing a service request according to an embodiment of the present disclosure. As shown in FIG. 1, the method for processing a service request according to the embodiment of the present disclosure includes the following steps 101 to 106.

In step 101, a target time period is determined based on a time instant when a first server is switched to a second server.

In the embodiment of the present disclosure, when the server for processing a service request is switched from the first server to the second server, the target time period is determined based on the time instant when the first server is switched to the second server. The target time period includes the time instant when the first server is switched to the second server. For example, if the time instant when the first server is switched to the second server is 10 o'clock, a time period from 9:58 to 10:02 may be determined as the target time period.

As described in the background part, according to the civil aviation passenger transportation technology, the electronic ticket management system adopts an architecture including a primary server and a backup server to ensure the high availability of the system. When the primary server fails, the primary server may be rapidly switched to the backup server, and once the primary server restores, the backup server may be instantly switched to the primary server, thereby ensuring service continuity. Furthermore, in the method for processing a service request according to the embodiment of the present disclosure, the primary server may be switched to the backup server, or the backup server may be switched to the primary server, which is not limited.

In step 102, log data of the first server and log data of the second server in the target time period are acquired.

The log data of the first server and the log data of the second server in the target time period are acquired. The log data records service requests processed by the first server and the second server during the target time period. Furthermore, in order to facilitate subsequent processing and analysis, the log data may be formatted, and the service requests recorded in the log data may be stored in a form of a transaction time instant, a transaction number, user information, text, and the like.

In step 103, a first service request and a second service request are acquired based on the log data. The first service request and the second service request are initiated by a same user, the first service request is processed by the first server, and the second service request is processed by the second server.

A service request recorded in the log data is acquired based on user information corresponding to the service request. Each of the service requests includes a transaction time instant, a transaction number, user information, an operation instruction and an operation object that correspond to the service request. In the embodiment of the present disclosure, for the convenience of description and understanding, descriptions are provide by taking that the first service request and the second service request are sequentially initiated by a same user as an example. In addition, the first service request is processed by the first server before the first server is switched to the second server, and the second service request is processed by the second server after the first server is switched to the second server.

In practices, the number of users is not limited in the present disclosure. That is, the service requests recorded in the log data are segmented based on user information. The content in each of segments includes continuous operations of a same user in the target time period, and the continuous operations are automatically arranged in a chronological order. The segments are independent of each other, and may be analyzed in parallel without affecting each other.

In step 104, it is determined whether the first service request is associated with the second service request based on an operation instruction of the first service request and an operation instruction of the second service request.

Before determining whether the first service request is associated with the second service request, historical service requests may be used as training samples for clustering analysis, so that the service requests are grouped based on association features of operation instructions. Specifically, since different service requests usually have contextual associations, a transaction request may be determined as a center, and service requests corresponding to operation instructions that have contextual associations with the transaction request may be grouped into a group, and then multiple fixed transaction groups are trained. Thus, a "target transaction group" in the present disclosure is obtained, and the target transaction group includes at least one target operation instruction.

In practices, there may be multiple target transaction groups, such as a booking transaction group, a refunding transaction group, and the like. The booking transaction group includes requests having contextual associations, such as a reservation request, an upgrade request, and a payment request. In a case that an operation instruction of a service request is same as one target operation instruction in the target transaction group, it may be determined that the service request belongs to the target transaction group. Service requests belonging to a same target transaction group may be determined as associated requests. For case of understanding, in the embodiments of the present disclosure, descriptions are provided by taking that the number of the target transaction group is one as an example.

The target operation instruction of the target transaction group is determined as a center point. For example, in a case that the target operation instruction includes an M instruction and an N instruction, both the M instruction and the N instruction are the center point of the target transaction group. In a case that a distance from the operation instruction of the first service request to the M instruction (that is, the center point) is equal to 0 and a distance from the operation instruction of the second service request to the N instruction (that is, the center point) is equal to 0, it indicates that the first service request belongs to the target transaction group and the second service request belongs to the target transaction group. In this case, the first service request and the second service request belong to the same target transaction group, and it indicates that the first service request is associated with the second service request. In a case that a distance from the operation instruction of the first service request to the M instruction (that is, the center point) is equal to 0 and either a distance from the operation instruction of the second service request to the M instruction or a distance from the operation instruction of the second service request to the N instruction (that is, the center point) is not equal to 0, it indicates that the first service request belongs to the target transaction group and the second service request does not belong to the target transaction group. In this case, the first service request and the second service request do not belong to the same target transaction group, and it indicates that the first service request is not associated with the second service request.

In step 105, in a case that the first service request is associated with the second service request, it is determined whether an operation object of the first service request is same as an operation object of the second service request.

As described in step 103, each of the service requests includes a transaction time instant, a transaction number, user information, an operation instruction, and an operation object that correspond to the service request. After determining that the first service request is associated with the second service request, it is further determined whether the operation object of the first service request is the same as the operation object of the second service request.

In step 106, in a case that the operation object of the first service request is different from the operation object of the second service request, it is determined that the operation object of the second service request is incorrect.

Since the first service request and the second service request are initiated by the same user, in a case that the operation object of the first service request is different from the operation object of the second service request, it may be determined that the operation object of the second service request is incorrect. The first service request is processed by the first server, and the second service request is processed by the second server after the first server is switched to the second server. However, in the second server processing the second service request, the first service request does not exist in the second server, thus the second service request cannot be associated with the first service request for processing and the second service request is associated with other service requests, so that the operation object of the second service request is incorrect.

Furthermore, since the first service request is processed by the first server before the first server is switched to the second server, it may be determined that the operation object of the first service request is correct. Based on the operation object of the first service request, the operation object of the second service request may be modified to be the same as the operation object of the first service request, thereby performing error correction on the operation object of the second service request.

In the embodiments of the present disclosure, when the server for processing a service request is switched from the first server to the second server, the target time period is determined based on a switching time instant, and log data during the target time period is acquired. The first service request and the second service request corresponding to the user are acquired based on the log data, where the second service request is initiated by the user after the first service request. It is determined whether the first service request is associated with the second service request based on the operation instruction of the first service request and the operation instruction of the second service request. In a case that the first service request is associated with the second service request, it indicates that the second service request is initiated based on the first service request. It is determined whether the operation object of the first service request is the same as the operation object of the second service request. In a case that the operation object of the first service request is different from the operation object of the second service request, it is determined that the operation object of the second service request is incorrect. According to the above method, after the first server is switched to the second server, it is determined whether the associated requests are correctly processed based on the log data of the first server and the log data of the second server, thereby troubleshooting errors in the server processing service requests.

The flow charts and block diagrams in the drawings illustrate possible system architectures, functions and operations that may be implemented by a system, a method, and a computer program product according to various embodiments of the present disclosure. Each block in the flow charts or the block diagrams may represent a part of a module, a program section or codes, and a part of the module, the program section or the codes includes one or more executable instructions for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of blocks in the block diagrams and/or flow charts and a combination of the blocks in the block diagrams and/or flow charts may be implemented by a dedicated hardware-based system that performs specified functions or operations, or may be implemented by a combination of dedicated hardware and computer instructions.

The names of messages or information exchanged between multiple apparatuses in the embodiments of the present disclosure are only for illustrative purposes, and are not intended to limit the scope of the messages or information.

Figure 2:
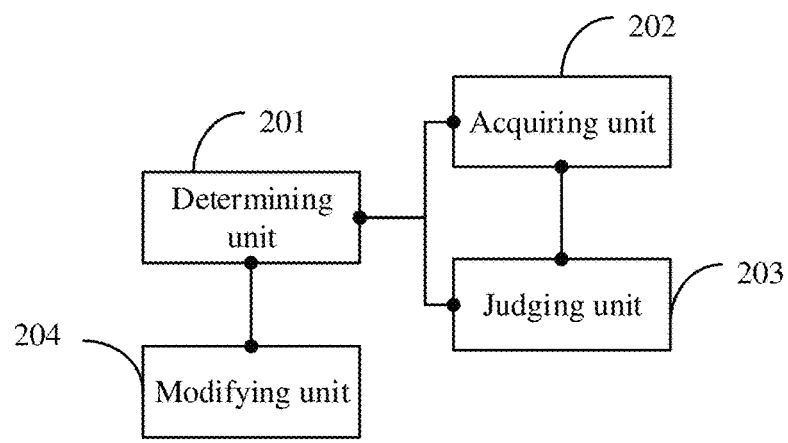
FIG. 2 is a schematic structural diagram of an apparatus for processing a service request according to an embodiment of the present disclosure.

Hereinafter, an apparatus for processing a service request according to an embodiment of the present disclosure is described. As shown in FIG. 2, an apparatus for processing a service request is provided according to an embodiment of the present disclosure. The apparatus includes: a determining unit 201, an acquiring unit 202, and a judging unit 203.

The determining unit 201 is configured to determine a target time period based on a time instant when a first server is switched to a second server.

The acquiring unit 202 is configured to acquire log data of the first server and log data of the second server during the target time period.

The acquiring unit 202 is further configured to acquire a first service request and a second service request based on the log data of the first server and the log data of the second server. The first service request and the second service request are initiated by a same user, the first service request is processed by the first server, and the second service request is processed by the second server.

The judging unit 203 is configured to determine whether the first service request is associated with the second service request based on an operation instruction of the first service request and an operation instruction of the second service request.

The judging unit 203 is further configured to determine whether an operation object of the first service request is the same as an operation object of the second service request in a case that the first service request is associated with the second service request.

The determining unit 201 is further configured to determine that the operation object of the second service request is incorrect in a case that the operation object of the first service request is different from the operation object of the second service request.

In an embodiment, based on the embodiment as shown in FIG. 2, the apparatus for processing a service request according to the embodiment of the present disclosure further includes a modifying unit 204.

The modifying unit 204 is configured to modify the operation object of the second service request based on the operation object of the first service request.

In an embodiment, based on the embodiment as shown in FIG. 2, in the apparatus for processing a service request according to the embodiment of the present disclosure, the determining unit 201 is configured to: acquire a target transaction group, where the target transaction group includes at least one target operation instruction; determine the target operation instruction as a center point; determine, in a case that a distance from the operation instruction of the first service request to the center point is equal to 0 and a distance from the operation instruction of the second service request to the center point is 0, that the first service request and the second service request belong to the target transaction group; and determine that the first service request is associated with the second service request.

In an embodiment, based on the embodiment as shown in FIG. 2, in the apparatus for processing a service request according to the embodiment of the present disclosure, the determining unit 201 is further configured to: determine, in a case that the distance from the operation instruction of the first service request to the center point is equal to 0 and the distance from the operation instruction of the second service request to the center point is not equal to 0, that the first service request belongs to the target transaction group and the second service request does not belong to the target transaction group; and determine that the first service request is not associated with the second service request.

In the embodiment, the apparatus for processing a service request may perform operations described in the embodiments shown in FIG. 1, which is not repeated herein.

The functions described above herein may be performed at least partially by one or more hardware logic units. For example, without limitation, exemplary types of hardware logic components that may be used include: a field programmable gate array (FPGA), an application specific integrated circuit (ASIC), an application specific standard product (ASSP), a system on chip (SOC), a complex programmable logical device (CPLD) and the like.

A computer-readable storage medium, storing one or more computer execution instructions, is further provided according to the present disclosure. The computer execution instructions, when executed by a processor, cause the processor to perform the method according to any one of the embodiments described above as shown in FIG. 1.

It should be noted that, the computer-readable medium in the present disclosure may be a computer-readable signal medium or a computer-readable storage medium or any combination thereof. The computer-readable storage medium may include, but is not limited to, a system, an apparatus, or a device in an electronic, magnetic, optical, electromagnetic, infrared, or semi-conductive form, or any combination thereof. Specifically, the computer-readable storage medium may include, but is not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device or any suitable combination thereof. In the present disclosure, the computer-readable storage medium may be any tangible medium including or storing a program, and the program may be used by or used in combination with an instruction execution system, apparatus, or device. In the present disclosure, the computer-readable signal medium may include a data signal in a baseband or transmitted as a part of a carrier wave and carrying computer-readable program codes. The transmitted data signal may be in various forms, including but not limited to an electromagnetic signal, an optical signal or any proper combination thereof. The computer-readable signal medium may alternatively be any computer-readable medium other than the computer-readable storage medium. The computer-readable signal medium may send, propagate or transmit a program that is used by or used in combination with an instruction execution system, apparatus or a component. The program codes stored in the computer-readable medium may be transmitted via any proper medium including but not limited to: a wire, an optical cable, radio frequency (RF) and the like, or any proper combination thereof.

The computer-readable medium may be included in the electronic device, or may exist independently without being assembled into the electronic device.

Particularly, according to the embodiments of the present disclosure, the processes described above in conjunction with flow charts may be implemented as a computer software program. For example, a computer program product is provided according to an embodiment of the present disclosure. The computer program product includes a computer program carried on a non-transient computer-readable medium. The computer program includes program codes for performing the method as shown in FIG. 1.

Figure 3:
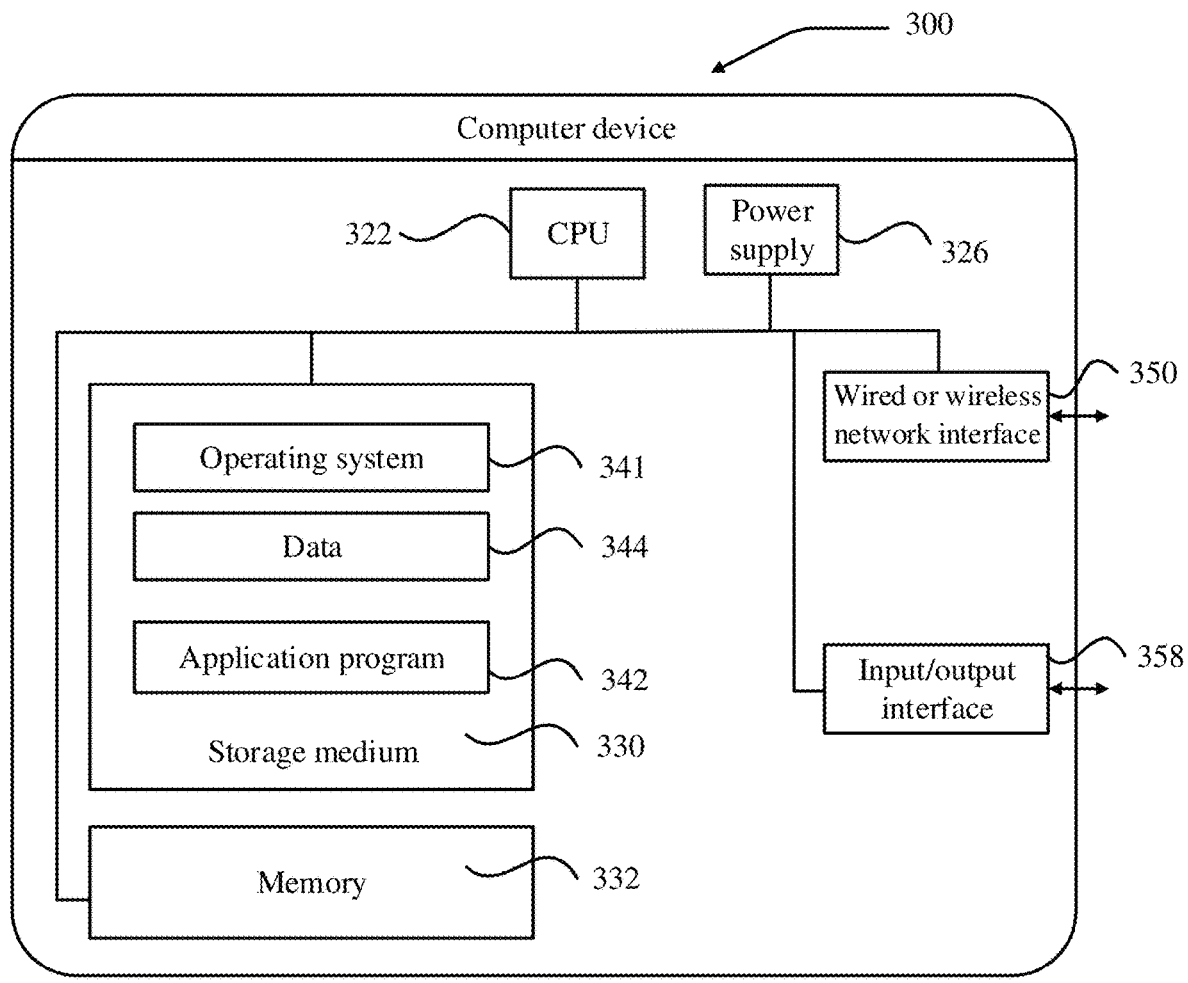
FIG. 3 is a schematic structural diagram of a computer device according to an embodiment of the present disclosure.

A computer device is further provided according to an embodiment of the present disclosure. The computer device is configured to perform the method for processing a service request according to the embodiment as shown in FIG. 1. Reference is made to FIG. 3, which is a schematic structural diagram of a computer device according to an embodiment of the present disclosure. As shown in FIG. 3, the computer device 300 may vary greatly due to different configurations or performance. The computer device 300 may include one or more central processing units (CPUs) 322 (for example, one or more processors), a memory 332, and one or more storage mediums 330 (for example, one or more mass storage devices) that store an application program 342 or data 344. The memory 332 and the storage mediums 330 may perform temporary storage or persistent storage. The program stored in the storage mediums 330 may include one or more modules (not shown in FIG. 3), and each of the modules may include a series of instruction operations in the computer device. Further, the central processing units 322 may be configured to communicate with the storage medium 330, and perform, on the computer device 300, the series of instruction operations stored in the storage medium 330.

The computer device 300 may further include one or more power supplies 326, one or more wired or wireless network interfaces 350, one or more input/output interfaces 358, and/or one or more operating systems 341 such as Windows Server™, Mac OS X™, Unix™, Linux™, or FreeBSD™.

The method for processing a service request according to the foregoing embodiments may be performed based on the structure of the computer device shown in FIG. 3.

A computer-readable storage medium is further provided according to an embodiment of the present disclosure. The computer-readable storage medium stores a computer program. The computer program, when executed on a computer, causes the computer to perform the method according to the foregoing embodiments.

A computer program product including a program is further provided according to an embodiment of the present disclosure. The computer program product, when executed on a computer, causes the computer to perform the method according the foregoing embodiments.

Those skilled in the art may clearly understand that, for convenience and brevity of description, for a detailed operation process of the foregoing system, apparatus and unit, reference may be made to a corresponding process in the foregoing embodiments of the method, which is not repeated herein.

In the embodiments according to the present disclosure, it should be understood that the disclosed system, apparatus and method may be implemented in other forms. For example, the foregoing embodiments of the apparatus are only schematic. For example, the division of the units is only a division according to logical functions, and there may be other division manners in the practical implementation. For example, multiple units or components may be combined or may be integrated into another system, and some features may be omitted or may not be performed. In addition, coupling, direct coupling or communication connection displayed or discussed above may be realized by some interfaces, or indirect coupling or communication connection of apparatus or units, and may be electrical, mechanical or of other forms.

The units described as separate components may or may not be physically separate, and the components displayed as units may or may not be physical units, that is, the components may be located in one place, or may be distributed to multiple network units. Some or all of the units may be selected to implement the objective of the technical solution of the embodiment based on actual requirements.

In addition, functional units in the various embodiments of the present disclosure may be integrated into one processing unit, or each unit may exist independently, or two or more units may be integrated in one processing unit. The above integrated units may be implemented in a form of hardware, or in a form of software function unit.

The integrated units may be stored in a computer-readable storage medium in a case that the integrated units are implemented in the form of software function unit and sold or used as an independent product. Based on such an understanding, the technical solutions of the present disclosure essentially, or a part contributing to the conventional technology, or all or a part of the technical solutions may be implemented in a form of a software product. The computer software product is stored in a storage medium and includes several instructions for instructing a computer device (which may be a personal computer, a management device for interactive videos or a network device) to perform all or some of the steps of the method described in the embodiments of the present disclosure. The foregoing storage medium includes various medium which can store program codes, such as a U disk, a mobile hard disk, a read-only memory (ROM), a random-access memory (RAM), a magnetic disk or an optical disk.

The foregoing embodiments are merely provided for describing the technical solutions of the present disclosure, rather than limiting the present disclosure. Although the present disclosure is described in detail with reference to the foregoing embodiments, it should be understood that those skilled in the art can still modify the technical solutions described in the foregoing embodiments, or make equivalent substitutions to some of the technical features. Such modifications or substitutions do not cause the essence of corresponding technical solutions to depart from the spirit and scope of the technical solutions according to the embodiments of the present disclosure.

The invention claimed is:

1. A method for processing a service request, comprising:
determining a target time period based on a time instant when a first server is switched to a second server;
acquiring log data of the first server and log data of the second server in the target time period;
acquiring a first service request and a second service request based on the log data of the first server and the log data of the second server, wherein the first service request and the second service request are initiated by a same user, the first service request is processed by the first server, and the second service request is processed by the second server;
determining whether the first service request is associated with the second service request based on an operation instruction of the first service request and an operation instruction of the second service request;
determining, in a case that the first service request is associated with the second service request, whether an operation object of the first service request is same as an operation object of the second service request; and
determining, in a case that the operation object of the first service request is different from the operation object of the second service request, that the operation object of the second service request is incorrect;
wherein the determining whether the first service request is associated with the second service request based on an operation instruction of the first service request and an operation instruction of the second service request comprises:
acquiring a target transaction group, wherein the target transaction group comprises at least one target operation instruction;
determining the target operation instruction as a center point;
determining, in a case that a distance from the operation instruction of the first service request to the center point is equal to 0 and a distance from the operation instruction of the second service request to the center point is equal to 0, that the first service request and the second service request belong to the target transaction group; and
determining that the first service request is associated with the second service request.

2. The method according to claim 1, wherein after determining that the operation object of the second service request is incorrect, the method further comprises:
modifying the operation object of the second service request based on the operation object of the first service request.

3. The method according to claim 1, wherein after determining the target operation instruction as the center point, the method further comprises:
determining, in a case that the distance from the operation instruction of the first service request to the center point is equal to 0 and the distance from the operation instruction of the second service request to the center point is not equal to 0, that the first service request belongs to the target transaction group and the second service request does not belong to the target transaction group; and
determining that the first service request is not associated with the second service request.

4. An apparatus for processing a service request, comprising:
a processor;
a determining unit, configured to determine a target time period based on a time instant when a first server is switched to a second server;
an acquiring unit, configured to acquire log data of the first server and log data of the second server in the target time period, and acquire a first service request and a second service request based on the log data of the first server and the log data of the second server, wherein the first service request and the second service request are initiated by a same user, the first service request is processed by the first server, and the second service request is processed by the second server; and
a judging unit, configured to determine whether the first service request is associated with the second service request based on an operation instruction of the first service request and an operation instruction of the second service request, and determine whether an operation object of the first service request is same as an operation object of the second service request in a case that the first service request is associated with the second service request, wherein the determining unit is further configured to, in a case that the operation object of the first service request is different from the operation object of the second service request, determine that the operation object of the second service request is incorrect;
wherein the determining unit is further configured to:
acquire a target transaction group, wherein the target transaction group comprises at least one target operation instruction;
determine the target operation instruction as a center point;
in a case that a distance from the operation instruction of the first service request to the center point is equal to 0 and a distance from the operation instruction of the second service request to the center point is equal to 0, determine that the first service request and the second service request belong to the target transaction group; and
determine that the first service request is associated with the second service request.

5. The apparatus for processing a service request according to claim 4, further comprising:
a modifying unit, configured to modify the operation object of the second service request based on the operation object of the first service request.

6. The apparatus for processing a service request according to claim 4, wherein the determining unit is further configured to:
in a case that the distance from the operation instruction of the first service request to the center point is equal to 0 and the distance from the operation instruction of the second service request to the center point is not equal to 0, determine that the first service request belongs to the target transaction group and the second service request does not belong to the target transaction group; and
determine that the first service request is not associated with the second service request.

7. A computer device, comprising:
a memory, storing program codes; and
a processor, configured to, when executing instructions in the program codes, perform the method for processing a service request according to claim 1.

8. A computer-readable storage medium, storing instructions, wherein the instructions, when executed by a computer, cause the computer to perform the method for processing a service request according to claim 1.

\* \* \* \* \*